United States Patent [19]

Curtis

[11] Patent Number: 4,678,978
[45] Date of Patent: Jul. 7, 1987

[54] QUIETING CIRCUITS FOR PERMANENT MAGNET SYNCHRONOUS MOTORS

[75] Inventor: Harold W. Curtis, Stoughton, Mass.

[73] Assignee: Brookfield Engineering Laboratories, Inc., Stoughton, Mass.

[21] Appl. No.: 754,334

[22] Filed: Jul. 12, 1985

Related U.S. Application Data

[63] Continuation of Ser. No. 537,099, Sep. 29, 1983, abandoned, which is a continuation of Ser. No. 241,399, Mar. 6, 1981, abandoned.

[51] Int. Cl.⁴ .............................................. H02K 19/02
[52] U.S. Cl. .................................... 318/690; 318/817; 318/696

[58] Field of Search ............... 318/716, 765, 778, 780, 318/784, 794, 795, 817, 700–702, 722, 723, 438, 690, 695, 696; 310/156

[56] References Cited

U.S. PATENT DOCUMENTS

| | | | |
|---|---|---|---|
| 2,458,100 | 1/1949 | Rotors | 318/701 |
| 2,589,999 | 3/1952 | Feiertag et al. | 310/156 |
| 3,121,832 | 2/1964 | Haskell et al. | 318/701 |
| 3,440,508 | 4/1969 | Fujita | 318/701 |

Primary Examiner—David Smith, Jr.

[57] ABSTRACT

Quieting circuits for synchronous electric motors bypass their phase shifting coils with a minor percentage of the total motor watts input.

10 Claims, 7 Drawing Figures

QUIETING CIRCUITS FOR PERMANENT MAGNET SYNCHRONOUS MOTORS

This is a continuation of application Ser. No. 537,099, filed Sep. 29, 1983, now abandoned, as a continuation of Ser. No. 241,399, filed Mar. 6, 1981, now abandoned.

BACKGROUND OF THE INVENTION

Permanent magnet synchronous motors are used where absolute speed is required in various types of instruments, computers, music reproducing, and hospital equipment.

The typical permanent magnet synchronous motor wiring practice is to place a capacitor in series with the phase shifted motor oil. The selected value of that capacitor determines the phase shift angle, the current flow and voltage to that coil, and the performance behavior of the motor as well as directionability. In some instances, an additional external resistor is put in series with the capacitor to refine motor characteristics by limiting or adjusting current flow through the phase shifted coil.

Even under optimum selections of the capacitor and resistor, roughness affecting angular acceleration and deceleration of the rotor shaft creates gear train noise problems in many applications requiring the use of such motors.

THE PRESENT INVENTION

The general objective of the present invention is to provide means by which the operation of this category of motors may be smoothed or quieted without jeopardizing current values, output torque, synchronization, or any of the other of their desirable characteristics.

In accordance with the invention, the objective is attained by paralleling the phase shifted coil with a capacitor operable to bypass a minor percentage of the total watt motor input to quiet the motor to a wanted extent.

In some instances a capacitor network may be employed with the basic, phase shifting capacitor value divided between two individual capacitors straddling the phase shifted coil and the bypass capacitor may straddle one of them. The required bypass capacitor value may be divided between individual capacitors.

There are variables among various motors of the type with which the invention is concerned that prevent the establishing of a useable ratio between phase shifting and bypass capacitors. Improved performance results, however, when a bypass capacitor is used the value of which is about one-third that of the phase shifting capacitor.

It is, accordingly, preferred that the value of the bypass capacitors be determined by their ability to bypass a minor percentage of the total watts motor input. While the use of any such capacitor is attended by improved motor performance, optimum results are attainable, in the case of nominal 230 VAC with the bypass percentage increasing at a substantially constant rate from about 10% with an assumed three watt total input to about 18% with an assumed approximately five watt total motor input. In the case of nominal 115VAC, optimum results are achieved with the bypass percentage increasing at a substantially constant rate from about 20% with an assumed two and one-half watt total input to about 30% with an assumed seven watt total input.

While in most cases optimum quieting is achieved by the use of a capacitor or capacitors of appropriate values, in a small percentage of cases it may also require series resistance values, parallel resistance values or both at any or all of the bypass capacitor locations.

PRIOR ART STATEMENT

Applicant is not aware of any prior art patent that is pertinent to the subject matter of the present invention and present patent application or of any pertinent information in addition to that previously included.

BRIEF DESCRIPTION OF THE DRAWINGS

The accompanying drawings illustrate preferred embodiments of the invention of which

THE PREFERRED EMBODIMENT OF THE INVENTION

Figure 1:
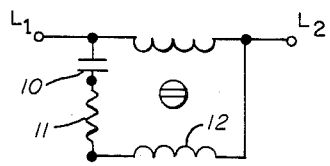
FIG. 1 is a schematic showing of a common prior art permanent magnet, synchronous motor circuit.

Reference is first made to FIG. 1 in which typical prior art permanent magnet synchronous motor crcuit is schematically illustrated in which a phase shifting capacitor 10 and a resistor 11 are in series with the phase shifted coil 12. Even with the best choice of the capacitor and resistor, roughness affecting angular acceleration and deceleraticn of the rotor shaft creates gear train noises that are a problem in many devices requiring the use of such synchronous motors.

In FIGS. 2-6, quieting circuits in accordance with the invention are schematically illustrated with components, corresponding to those of the circuit of FIG. 1 designated by the same reference numerals distinguished by the suffix additions A, B, C, D, and E, respectively.

Figure 2:
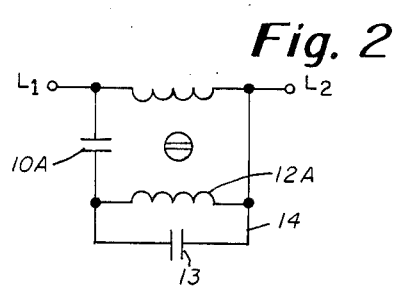
FIG. 2 is a like view of a circuit, in accordance with the invention, for such a motor.

In FIG. 2, quieting is attained by the addition to the motor circuit of a capacitor 13 placed in a lead 14 in parallel with the phase shifted coil 12A and operable to bypass a wanted minor percentage of the total watt motor input, an essential feature of all embodiments of the invention.

Figure 3:
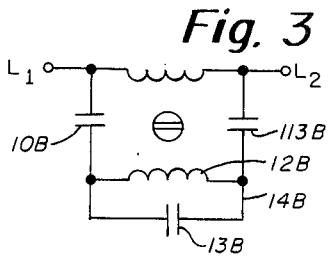
FIG. 3 is a like view of another embodiment of the invention utilizing first and second bypass capacitors, the first straddling and the second following the phase shifting coil.
Figure 4:
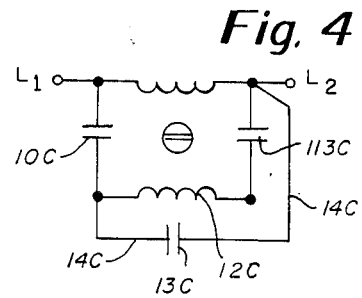
FIG. 4 is another like view of a quieting circuit similar to that of FIG. 3 but with the first bypass capacitor straddlirg the phase shifting coil and the second bypass capacitor.

It has also proved effective, particularly with the larger motors, to divide the value of the main or phase shifting capacitor between first and second capacitors, see FIG. 3, wherein the capacitors 13B and 113B straddle the coil 12B. As illustrated by FIG. 4, the bypass capacitor 13C may also straddle the second capacitor 113C.

Figure 5:
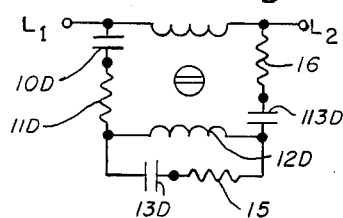
FIG. 5 is a like view of yet another embodiment of the invention with the required bypass capacitor value divided between first and second capacitors with resistors in series with each of them.

The embodiment of the invention illustrated by FIG. 5 is generally similar to that of FIG. 3 with the additional feature of providing a resistor 15 in series with the capacitor 13D and a resistor 16 in series with the capacitor 113D.

Figure 6:
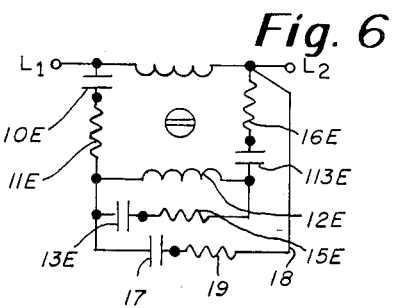
FIG. 6 is a schematic view of yet another circuit with the wanted bypass capacitor value divided among three capacitors each of which has a resistor in series therewith.

In the embodiment of the invention illustrated by FIG. 6, the wanted bypass capacitor value is divided among three capacitors, the capacitors 13E and 113E straddling the coil 12E and the capacitor 17 in a lead 18 straddling the other bypass capacitors. Resistors 15E, 16E, and 19 are in series with the capacitors 13E, 113E, and 17, respectively.

It should be here noted that while resistors have been shown in both FIGS. 5 and 6, in approximately 95% of the cases, optimum quieting is achieved without requiring their use.

While the introduction of any capacitor into the circuit of a permanent magnet synchronous motor that will bypass a minor percentage of the total motor watt input, will have a quieting effect, optimum quietness of motor performance, is, of course, a prime objective.

It has been determined that the ratio of the main and bypass capacitors does not afford a useful guide as will be apparent from the following examples derived from the quieting of several different makes and models.

|  | Main Capacitor | Bypass Capacitor | Ratio |
| --- | --- | --- | --- |
| 115/50 VAC | .39 MFD | .068 MFD | .17 |
| 115/50 VAC | .56 MFD | .24 MFD | .43 |
| 115/60 VAC | .39 MFD | .22 MFD | .56 |
| 115/60 VAC | .56 MFD | .39 MFD | .70 |
| 115/60 VAC | .68 MFD | .33 MFD | .49 |
| 230/50 VAC | .085 MFD | .01 MFD | .12 |
| 230/50 VAC | .15 MFD | .025 MFD | .17 |
| 230/60 VAC | .10 MFD | .05 MFD | .50 |
| 230/60 VAC | .10 MFD | .03 MFD | .30 |

Utilizing the percentage of the total motor watts input that must be bypassed to attain optimum motor performance enables correct capacitor values to be selected whether by the motor manufacturer or in the correction of an existing motor circuit.

Figure 7:
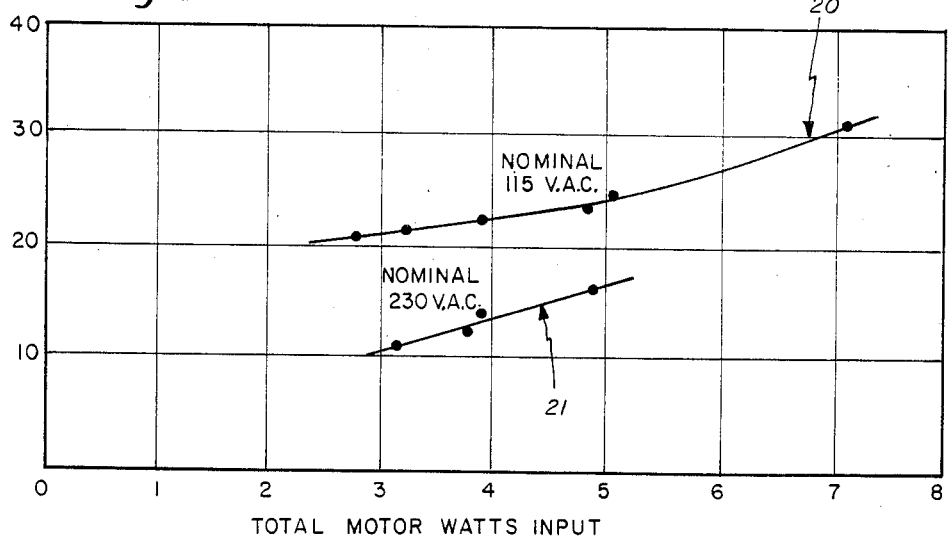
FIG. 7 is a graph showing the percentage relationship to be bypassed from any particular motor watt input for both 115 VAC and 230 VAC circuits.

In FIG. 7 the graph line 20 represents, for nominal 115 VAC, the percentage of the total motor watts that should be bypassed relative to the total motor watts input and the line 21 provides the same information for nominal 230 VAC.

With reference to FIGS. 5 and 6, resistors in series with the phase shifted coils and capacitors may have values from 0 ohms to values substantially equivalent to the resistor value of the phase shifted coils. The resistors will not necessarily have identical values in any one application but will be individually selected to best suit the total quieting function.

Resistors in series with bypass capacitors may have values ranging from 0 ohms to values substantially in the megohm range.

The resistors may be used with one or more of the capacitors. The capacitors 13D and 13E are the primary bypass capacitors. Lowering the resistance value of one or more of the resistors to a low order of magnitude, that is, approaching 0 ohms leaves the adjacent series capacitor functional in that part of the circuit.

I claim:

1. A quieting circuit with a permanent magnet, fully synchronous absolute speed electric motor, the circuit including a first lead provided with a coil between first and second lines, a parallel lead between the first and second lines provided with a phase shifting capacitor and a phase shifted coil, and a lead in parallel with the phase shifted coil between the phase shifting capacitor and the second line and including means to bypass a minor percentage of the total watts motor input, said means including at least one capacitor.

2. The motor circuit of claim 1 in which the bypass percentage, in the case of 230 VAC increases at a substantially constant rate from about 10% with an assumed three watt total input to about 18% with an assumed approximately five watt total input.

3. The motor circuit of claim 1 in which the bypass percentage in the case of 115 VAC increases at a substantially constant rate from about 20% with an assumed two and one-half watt total input to about 30% with an assumed seven watt total input.

4. The motor circuit of claim 1 in which the MFD value wanted to effect bypassing is divided between first and second capacitors which straddle the phase shifted coil.

5. The motor circuit of claim 1 in which the MFD value wanted to effect bypassing is divided between first and second capacitors, the first capacitor straddling the phase shifted coil and the second capacitor.

6. The motor circuit of claim 1 in which the MFD value wanted to effect bypassing is divided among first, second, and third capacitors, the first capacitor strrddling the phase shifted coil and the second capacitor and the third capacitor straddling the second capacitor.

7. The motor circuit of claim 1 in which there is a resistor in series with the bypass capacitor.

8. The motor circuit of claim 1 in which the MFD value wanted to effect bypassing is shared by a plurality of capacitors and there is a resistor in series with at least one of the capacitors.

9. The motor circuit of claim 8 in which there is a resistor in series with each capacitor.

10. The motor circuit of claim 1 in which the impedance of the means to bypass is limited substantially entirely to capacitance.

* * * * *